United States Patent

Young

[11] 4,038,167
[45] July 26, 1977

[54] METHOD OF FORMING A THIN FILM CAPACITOR

[75] Inventor: Peter L. Young, Horseheads, N.Y.
[73] Assignee: Corning Glass Works, Corning, N.Y.
[21] Appl. No.: 656,527
[22] Filed: Feb. 9, 1976
[51] Int. Cl.$^2$ .................. C23C 15/00; H01G 4/10
[52] U.S. Cl. .................. 204/192 D; 29/25.42; 29/570; 361/322
[58] Field of Search .......... 204/192; 29/25.42, 570; 317/258

[56] References Cited

U.S. PATENT DOCUMENTS

| 3,257,305 | 6/1966 | Varga | 204/192 |
| 3,969,197 | 7/1976 | Tolar et al. | 204/15 |

OTHER PUBLICATIONS

P. Lloyd, "Thin-Film Capacitors Using Tantalum Oxide Dielectrics Prepared by Reactive Sputtering", Solid-State Electronics, July 1961, pp. 74–75.

L. Maissel et al., "Handbook of Thin-Film Technology", McGraw-Hill (1970), pp. 19–28.

Primary Examiner—John H. Mack
Assistant Examiner—Aaron Weisstuch
Attorney, Agent, or Firm—Walter S. Zebrowski; Clarence R. Patty, Jr.

[57] ABSTRACT

A method of forming a thin film capacitor having a tantalum oxide dielectric is described. A dielectric substrate having a non-tantalum electrically conductive film electrode formed thereon is disposed within an oxygen-nitrogen-inert gas containing vacuum environment. A film of tantalum oxide is applied over the conductive film by r-f sputtering of a tantalum oxide target within said vacuum environment while the dielectric substrate and conductive film are being cooled. The composite may then be removed from the oxygen-nitrogen-inert gas vacuum environment and a second electrically conductive film electrode applied over the so-formed tantalum oxide film.

10 Claims, 4 Drawing Figures

METHOD OF FORMING A THIN FILM CAPACITOR

BACKGROUND OF THE INVENTION

1. Field of the Invention

The present invention relates to a method of forming a thin film capacitor having a tantalum oxide dielectric.

2. Description of the Prior Art

In the manufacture of thin film capacitors, it has heretofore been necessary to first form a thin film of tantalum as the first electrode on a dielectric substrate. This composite would then be placed in an anodizing bath to form a layer of tantalum oxide on the tantalum film, which procedure required an abnormally long period of time, thereby adding greatly to the cost of manufacturing a capacitor. Capacitors produced by such methods required the use of tantalum metal, resulting in a device having polar characteristics. Further, when in the past a definite capacitor pattern was required, complicated and time consuming photolithographic, or the like techniques were required to produce well defined edges to reduce edge effect problems.

Prior art efforts to form tantalum oxide dielectric layers on non-tantalum electrodes resulted in a significant reduction in the value of breakdown voltage with a large increase in leakage current.

SUMMARY OF THE INVENTION

An object of this invention is to provide a method of fabricating a non-polar tantalum oxide thin film capacitor without reducing the capacitance or the electrical series resistance as compared with prior art capacitors.

Further objects of this invention are to provide a method for forming a thin film capacitor which is economical, does not produce a significant decrease in the value of breakdown voltage, reduces the time of fabrication, eliminates the need for use of elemental tantalum, precious metals, or other expensive metals, one which can readily provide any desired capacitor pattern, and one which overcomes the heretofore noted disadvantages.

Broadly, according to the present invention, a suitable dielectric substrate is provided, to which is applied a non-tantalum electrically conductive film electrode. The substrate and conductive film is then disposed within an oxygen-nitrogen-inert gas containing vacuum environment and a film of tantalum oxide of desired thickness is applied over the conductive film without the oxygen-nitrogen-inert gas containing vacuum environment while the dielectric substrate and conductive film are being cooled. The composite so formed may then be removed from said vacuum environment and a non-tantalum electrically conductive film counter electrode applied over the dielectric film. If desired, the process may be substantially repeated to form a multi-layer capacitor.

Additional objects, features, and advantages of the present invention will become apparent to those skilled in the art from the following detailed description and the attached drawing in which, by way of example, only the preferred embodiment of this invention is illustrated.

DETAILED DESCRIPTION OF THE DRAWING

It is to be noted that the drawings are illustrative and symbolic of the invention, and there is no intention to indicate scale or relative proportions of the elements shown therein. For the purposes of simplicity, the present invention will be described in connection with the formation of a tantalum oxide film suitable for use as a dielectric in a capacitor.

Figure 1:
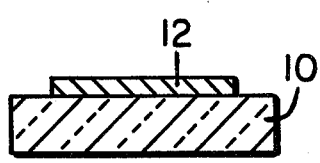
FIG. 1 is a cross-sectional view of a dielectric substrate with a first electrically conductive film electrode applied thereto.

Referring to FIG. 1 of the drawing, there is shown a dielectric substrate 10 to which is applied a non-tantalum electrically conductive film electrode 12. The material of dielectric substrate 10 may be any suitable dielectric material such as glass, ceramic, glass-ceramics, or the like. The material of electrode 12 may be any electrically conductive material which is compatible with tantalum oxide as well as compatible with the method of applying a film of tantalum oxide thereto, such as for example aluminum, nichrome, chromium, or the like.

Figure 2:
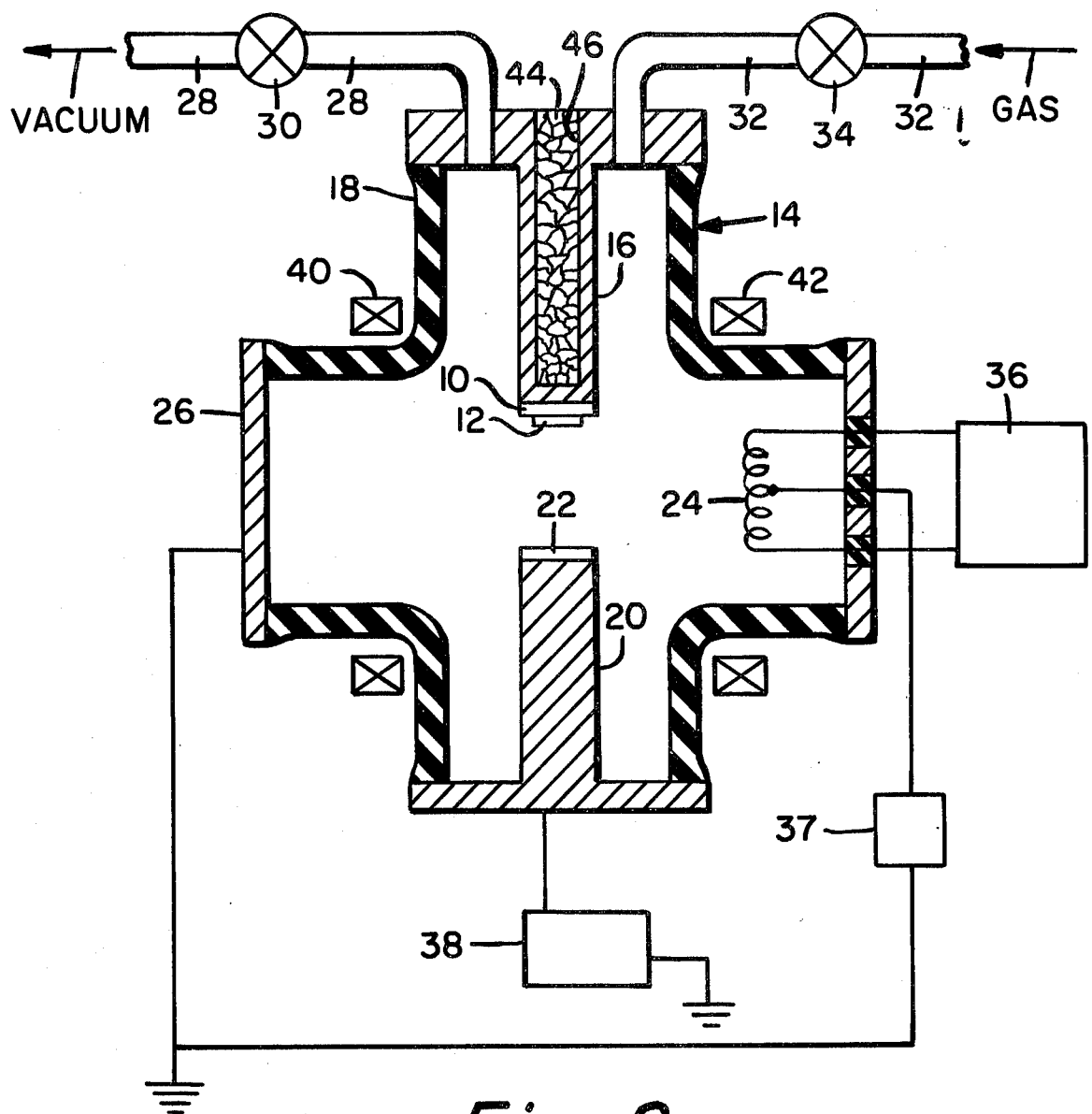
FIG. 2 is a diagrammatic cross-sectional view of an r-f sputtering apparatus suitable for use in the method of the present invention.

Referring also to FIG. 2, the composite so formed is disposed within a typical r-f sputtering apparatus 14. Apparatus 14 consists of a substrate holder 16 attached to one opening of apparatus housing 18. Adjacent to and opposite substrate holder 16 is target holder 20 attached to housing 18 at another opening therein. Target material 22 is disposed on holder 20 and is generally held in place by gravity, whereas substrate 10 and electrode 12 are disposed on substrate holder 16 and generally held in place by peripheral or exterior means such as clamps, or the like, not shown.

A filament cathode 24 is disposed within housing 18 while anode 26 is disposed over still another opening in housing 18. A vacuum pump, not shown, or other vacuum means is connectable to housing 18 by means of conduit 28 through control valve 30. A source, not shown, of inert ionizable gas, oxygen, and nitrogen is also connectable to apparatus housing 18 through conduit 32 and control valve 34. Electron producing filament cathode 24 is connected to a suitable dc power source 36 while anode 26 is illustrated connected to filament cathode 24 through a suitable dc power source 37. Target holder 20 is connected to a suitable r-f power source 38. A pair of magnetic coils 40 and 42 are disposed about the exterior of apparatus housing 18 and are also connected to a suitable source of electrical energy, not shown. A suitable quantity of coolant 44 is disposed within or circulated through cavity 46 of substrate holder 16.

Figure 3:
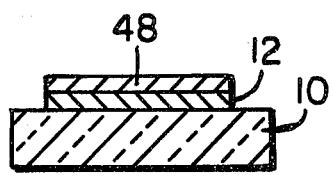
FIG. 3 is a cross-sectional view of the composite of FIG. 1 over which electrode a dielectric film has been applied.
Figure 4:
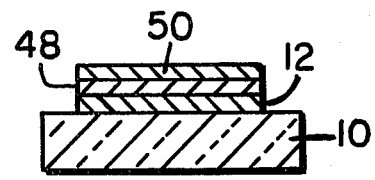
FIG. 4 is a cross-sectional view illustrating a capacitor formed by the present method.

The dielectric substrate-electrode composite of FIG. 1 is disposed on substrate holder 16 while a quantity of tantalum oxide 22 is disposed on target holder 20 within housing 18. Housing 18 is then sealed and a predetermined desired vacuum is drawn therein. The amount of vacuum drawn depends on the materials involved in the sputtering as well as, to some extent, on the electrical parameters of the various parts of the apparatus. A quantity of a mixture of an inert ionizable gas, oxygen, and nitrogen is then introduced into housing 18, reducing the vacuum to a predetermined desired level. One familiar with the art can readily select a suitable level of vacuum for a specific set of parameters. For the purposes of the present invention a range of oxygen-nitrogen-inert gas mixture ratios ranging from about 1:1:48 to about 2:2:46 by volume with the oxygen and nitrogen combined comprising at least about 2 percent of the total gas pressure within the environment is suitable. The ionizable gas may be any suitable inert ionizable gas such as argon, xenon, krypton, or the like. A plasma is then initiated by means of filament cathode 24, anode 26, and dc power sources 36 and 37 while suitable r-f energy is applied to target material 22 by r-f power source 38. A quantity of coolant 44, such as dry ice, for example, may be disposed within cavity 46 of substrate holder 16. The coolant may also be water circulated through cavity 46. Any coolant at a temperature of about 12° C. or lower is suitable for the present invention. If desired, magnetic coils 40 and 42 may be energized to focus the plasma. under these described conditions, target material 22 will be caused to sputter and be applied over electrode 12 on substrate 10. When desired, a mask may be interposed over electrode 12 to pattern the application of the target material on electrode 12. Such a mask is not shown, however, its nature will be readily understood by one familar with the art. After a suitable time period of sputtering, a layer or film 48 of target material 22 will be applied to electrode 12 as illustrated in FIG. 3. As heretofore described, the target material for thin film capacitors will be tantalum oxide, $Ta_2O_5$, which will comprise the capacitor dielectric. In the ordinary formation of a $Ta_2O_5$ film by r-f sputtering, the resulting film will be non-stoichiometric, that is it will be somewhat oxygen deficient. A capacitor formed with such a nonstoichiometric dielectric film will exhibit a high loss tangent, high leakage current and low breakdown voltage. A description of such problems is set out in my copending application entitled "Thin Film Capacitor and Method", Ser. No. 656,525 filed by P. L. Young on even date herewith, which application is expressly incorporated herein by reference. It has been found that sputtering $Ta_2O_5$ in an oxygen containing vacuum environment cures the non-stoichiometric condition of layer 44, that is, the resulting $Ta_2O_5$ layer or film is not oxygen deficient. By admitting a quantity of nitrogen into the vacuum environment, the amount of cooling necessary to obtain a satisfactory layer or film of $Ta_2O_5$ is decreased. The composite may then be removed from the vacuum environment and a counter electrode 50 applied over dielectric film 48 as shown in FIG. 4. Counter electrode 50 may be applied within the vacuum environment if desired and if the equipment is adaptable to such application. Counter electrode 50 as well as electrode 12 can be applied by any suitable method known in the art, such as for example, physical vapor deposition, electron beam evaporation or the like. Since electrode 12 and counter electrode 50 need not be formed of tantalum metal rather they may be formed of aluminum or the like, much cost of manufacturing the resulting product may be saved. Further, non-polar capacitor characteristics can be easily achieved without reducing the capacitance and/or increasing the electrical series resistance.

A typical example of the present invention is as follows. A 3000Å thick layer of aluminum is deposited on a glass substrate by physical vapor deposition to form the base electrode. The base electrode had a area of 5 cm$^2$. The substrate-electrode composite was placed in an r-f sputtering apparatus such as is illustrated in FIG. 2 and was attached to substrate holder 16 by means of suitable peripheral clamps. The aluminum electrode was exposed to a quantity of tantalum oxide disposed on a target holder adjacent and in opposition to the aluminum electrode. The r-f sputtering apparatus was secured and a vacuum of $10^{-6}$ Torr was drawn. A quantity of a mixture of oxygen, nitrogen, and argon gas was then introduced into the apparatus until the vacuum environment reached $5 \times 10^{-3}$ Torr. The oxygen-nitrogen-inert gas mixture contained about 2 percent by volume of oxygen with the oxygne and nitrogen combined comprising about 4 percent of the total gas pressure within the vacuum environment. A quantity of water at ambient. temperature was circulated within a cavity in the substrate holder to cool the substrate-electrode composite during sputtering. A plasma was created between the target holder and the aluminum electrode by energizing both the anode and filament dc power sources and by electrons which were emitted from the filament cathode and transmitted to the anode. The anode dc power source was energizded to a voltage of 110 volts while the filament dc power source was energized to a voltage of about 20 volts. An r-f power source connected to the target holder mounting the tantalum oxide was energized whereupon the tantalum was at a voltage of -2000 volts to ground at a frequency of 3.68 mHz. Under these conditions, tantalum oxide was caused to be sputtered from the target onto the surface of the aluminum electrode until a layer of $Ta_2O_5$ having a thickness of 3000Å and an area of 5 cm.$^2$ was deposited on the aluminum film. The period of time required for sputtering such a thickness of tantalum oxide was about 30 minutes. The substrate-electrode-tantalum oxide composite was allowed to cool and the environment within the chamber was brought to atmospheric pressure by introducing nitrogen gas therein. The composite was removed from the sputtering apparatus and a counter electrode of aluminum was vapor deposited onto the dielectric film of tantalum oxide. The resulting capacitor had a capacitance of 700 ufd. and a breakdown voltage of about 50 volts. Breakdown voltage is defined as that voltage necessary for a leakage current equal to or less than $10^{-9}$ amp for a 1000 pfd capacitor. The loss tangent at 1kHz was 0.25 percent and the leakage current at 25 volts was about $6 \times 10^{-11}$ amp. The resulting capacitor was further found to be non-polar.

It is to be noted that the only tantalum used in the construction of such a capacitor was the tantalum embodied in the tantalum oxide dielectric.

In the present specification capacitors having a single dielectric layer have been described. Multilayer capacitors, that is capacitors having a plurality of opposing electrodes, each pair thereof separated by a dielectric layer, may also be formed in accordance with the present method. In the formation of such multilayer capacitors, the hereinabove described process is repeated as many times as the number of layers desired, resulting in alternate electrodes and dielectric layers.

Although the present invention has been described with respect to details of certain embodiments thereof, it is not intended that such details be limitations upon the scope of the invention except insofar as set forth in the following claims.

We claim:
1. A method of forming a capacitor comprising the sequential steps of
providing a dielectric substrate, applying to said dielectric substrate a first electrically conductive non-tantalum film to form a first capacitor electrode, disposing said substrate and conductive film within a vacuum environment containing an oxygen-nitrogen-inert gas mixture, r-f sputtering a film of tantalum oxide of desired thickness over said conductive film within said vacuum environment, said tantalum oxide being sputtered from a tantalum oxide target, cooling said dielectric substrate and conductive film while said film of tantalum oxide is being sputtered thereon, and thereafter applying a second electrically conductive non-tantalum film over said film of tantalum oxide to form a counter capacitor electrode.

2. The method of claim 1 wherein the combined amount of oxygen and nitrogen in said gas mixture comprises at least about 2 percent of the total gas pressure within said environment.

3. The method of claim 2 wherein said vacuum environment has a total pressure of about $5 \times 10^{-3}$ Torr.

4. The method of claim 3 wherein at least one of said electrically conductive aluminum films is applied by vapor deposition.

5. The method of claim 3 wherein at least one of said electrically conductive films is formed of aluminum.

6. The method of claim 1 wherein one of said electrically conductive films is formed of aluminum.

7. The method of claim 6 wherein the other of said electrically conductive films is formed of aluminum.

8. The method of claim 1 wherein said vacuum environment has a pressure of about $5 \times 10^{-3}$ Torr.

9. The method of claim 1 further comprising the steps of disposing the composite so formed within a vacuum environment containing an oxygen-nitrogen-inert gas mixture, sputtering a second film of tantalum oxide of desired thickness over said second conductive film within said vacuum environment, said second film of tantalum oxide being sputtered from a tantalum oxide target, cooling said composite while said second film of tantalum oxide is being sputtered thereon, and thereafter applying a third electrically conductive non-tantalum film over said second film of tantalum oxide.

10. A thin film capacitor formed by the method of claim 1.

* * * * *